United States Patent [19]

Traut

[11] Patent Number: 4,615,933

[45] Date of Patent: Oct. 7, 1986

[54] RADOME STRUCTURE AND METHOD OF MANUFACTURE THEREOF

[75] Inventor: G. Robert Traut, Danielson, Conn.

[73] Assignee: Rogers Corporation, Rogers, Conn.

[21] Appl. No.: 597,710

[22] Filed: Apr. 6, 1984

[51] Int. Cl.⁴ .................... C23C 16/00; H01Q 1/42; D04H 1/20

[52] U.S. Cl. .................... 428/252; 264/112; 264/118; 264/120; 264/122; 264/127; 264/131; 264/570; 264/571; 343/872; 428/422

[58] Field of Search .............. 264/118, 122, 126, 127, 264/101, 570, 571, 162, 313, 314, 112, 131, 135, 136, 120; 343/872; 428/252, 422

[56] References Cited

U.S. PATENT DOCUMENTS

| 3,336,873 | 8/1967 | Wilford ................. | 264/257 |
| 3,532,784 | 10/1970 | Vasterling ............ | 264/152 |
| 3,956,447 | 5/1976 | Denommee et al. ..... | 264/135 |
| 4,067,950 | 1/1978 | Baruschke et al. ..... | 264/325 |
| 4,102,966 | 7/1978 | Duperray et al. ...... | 264/120 |
| 4,172,112 | 10/1979 | Tsukagoshi et al. .... | 264/127 |
| 4,213,930 | 7/1980 | Goodrich et al. ...... | 264/137 |
| 4,267,147 | 5/1981 | Pogoda et al. ........ | 264/571 |
| 4,267,237 | 5/1981 | Duperray et al. ...... | 264/112 |
| 4,285,896 | 8/1981 | Miller et al. ........ | 264/127 |
| 4,364,884 | 12/1982 | Traut ................ | 264/118 |

OTHER PUBLICATIONS

"The Condensed Chemical Dictionary", 10th ed., p. 997, Gessner 6, Hawleg, Van Nostrand Reinhold Co., QD5CS.

Primary Examiner—Donald Czaja
Assistant Examiner—MaryLynn Fertig
Attorney, Agent, or Firm—Fishman & Dionne

[57] ABSTRACT

A radome combines low dielectric constant and dissipation factor at microwave frequencies with mechanical strength and rigidity as well as resistance to ablation and rain erosion at hypersonic velocities in the range of Mach 4 to 6. Continuous filament glass fabric and/or strand is saturated with PTFE dispersion. Layers are applied to a mandrel and cold isostatically pressed. The pressed layer may be machined between applications and subsequent pressings. After all layers are applied and pressed, optionally including an outer ablation resistant random fiber reinforced PTFE composite, the densified structure is heat cycled above the crystalline melt point of the polymer to maximize mechanical properties.

78 Claims, 9 Drawing Figures

RADOME STRUCTURE AND METHOD OF MANUFACTURE THEREOF

BACKGROUND OF THE INVENTION (1) Field of the Invention

The present invention is directed to the fabrication of unitary structures, such as missile radomes, from fiber reinforced plastic material. More particularly, the present invention is directed to a unitary structure and method of manufacture thereof wherein at least one layer is comprised of woven or non-woven long filaments of a high strength material combined with a fluorocarbon polymer.

(2) Description of the Prior Art

The present invention has particular utility in the field of radomes.

Ceramic radomes are typically used for missiles intended to operate at speeds of Mach 4 or higher. These ceramic radomes have been found to be at best marginal in performance due to fragility, susceptibility to thermal shock, high thermal conductivity and high rates of rain impact damage. A definite need exists for a workable alternative to ceramic radomes.

Radomes of polymeric composite materials and methods of manufacture thereof are disclosed in U.S. Pat. No. 4,364,884 and co-pending application Ser. Nos. 263,191; 339,839 now U.S. Pat. No. 4,451,833 and 342,057, all of which are assigned to the assignee of the present invention and the entire disclosures of which are incorporated herein by reference.

U.S. Pat. No. 4,364,884, discloses a novel radome and method of making a radome comprised of a fiber reinforced plastic material wherein the fibers are to a high degree randomly oriented perpendicular to the axis of the radome.

In co-pending application Ser. No. 263,191, a novel radome structure comprised of a fiber reinforced plastic material is disclosed wherein the fibers are to a high degree randomly oriented parallel to the nearest or inner surface of the radome. This arrangement greatly improves longitudinal strength over the radome disclosed in U.S. Pat. No. 4,364,884, although perhaps at some sacrifice in resistance to rain erosion and ablation.

Both of the inventions disclosed by the above-identified applications provide various structural properties that are useful for differing applications.

Co-pending application Ser. No. 263,191 also discloses the use of a layer or liner, comprised of filaments or a honeycomb of high strength material saturated with an epoxy or polyimide resin. The liner is bonded to the interior of and forms a support for the polymeric fiber-reinforced composite material which forms the radome. This type of liner is easily produced, since epoxy and polyimide resins can be applied in liquid form to the filaments and then shaped before curing.

While the radomes of U.S. Pat. No. 4,364,884 and co-pending application Ser. Nos. 263,191; 339,839 and 342,057 are suitable for many applications, there are other applications and requirements (especially for radomes for noses of very high velocity missiles, such as on the order of 1300 meters/sec. (2900 miles/hour)) where there is a need for a radome having combined properties of high modulus, good electrical properties at microwave frequencies, good resistance to ablation and high strength to an extent not heretofore available.

SUMMARY OF THE PRESENT INVENTION

The present invention discloses high strength structure, and methods of manufacture thereof, which are especially suitable for radomes for the noses of high velocity missiles (on the order of 1300 m/s (2900 MPH)), the radomes having combined properties of high modulus, good electrical properties at microwave frequencies, good resistance to ablation, and high strength.

The structures of the present invention are unitary structures of high strength filaments and polytetrafluoroethylene (hereafter PTFE) or similar fluorocarbon polymers.

In the prior art, epoxy and polyimide systems are used in radome formation. The polymer is in a liquid state when polymer saturated filaments are assembled onto a forming mandrel; and a subsequent heat cure solidifies the assembly. However, this technique is not possible with PTFE or similar fluorocarbon polymers, because they are not available in liquid form (except as an aqueous dispersion), and when melted at high temperature they have very high viscosity. Thus the prior teachings for using epoxy and polyimide resins with high strength filaments are unsuitable when using a PTFE or similar fluorocarbon polymer.

In accordance with one embodiment of the present invention, strands of high strength filaments, preferably glass, are saturated with an aqueous dispersion of PTFE or similar fluorocarbon polymer. The aqueous dispersion is 40 to 80% water and 60 to 20% PTFE. Other suitable dispersion media include isopropanol.

The saturated strands are then dried to remove the water or other solvent, leaving only the strands of filaments with PTFE interspersed among and coated onto the filaments. The resulting material is 50 to 70% by weight fiber and 50 to 30% by weight PTFE.

The dry and coated strands are then positioned about a mandrel and then subjected to an external pressure normal to the mandrel by the isostatic pressing method as described in co-pending application Ser. No. 263,191. A densified composite is obtained, which is then machined to a desired contour. The procedure may be repeated one or more times. The resultant structure is heat cycled above the melt point of the fluorocarbon and then cooled and then machined to final shape.

There are numerous variations to the basic invention. The strands may be wrapped about the mandrel in alternating directions. Furthermore, the fibers may be in the form of a woven fabric having numerous weave arrangements. The woven fabric is saturated by the PTFE aqueous dispersion and dried similar to the strands.

Another embodiment of the present invention involves a composite structure having an inner layer of the fluorocarbon coated strands and an outer layer of a PTFE fiber composite wherein the fibers are to a high degree oriented parallel to the nearest or inner surface of the resulting structure as disclosed in co-pending application Ser. No. 263,191. This improves the longitudinal strength of the overall structure which sometimes is desirable.

BRIEF DESCRIPTION OF THE DRAWINGS

The present invention may be better understood and its various objects and advantages will become apparent to those skilled in the art by reference to the following drawings wherein like reference numerals refer to like elements in the several FIGURES and wherein.

DESCRIPTION OF THE PREFERRED EMBODIMENTS

In accordance with the present invention, radomes or other structures are formed of glass or similar fibers coated with PTFE or similar fluorocarbon polymers. The fibers are preferably in the form of long strands of continuous filament (extending in length usually as long as or longer than the length of the radome), with the diameter of individual fibers ranging from about 2 to about 12 micrometers. The polymer system to be used in the present invention is PTFE or similar fluorocarbon polymers. Since these fluorocarbon polymers are not available in liquid form, it is not possible to use an assembly technique where the polymer is saturated from a liquid form into multifilament strands that are used to build up a desired structure which is then cured under modest pressure or in an evacuated bag to form a fairly void-free structure. A significantly different assembly technique is required in the present invention.

Figure 1:
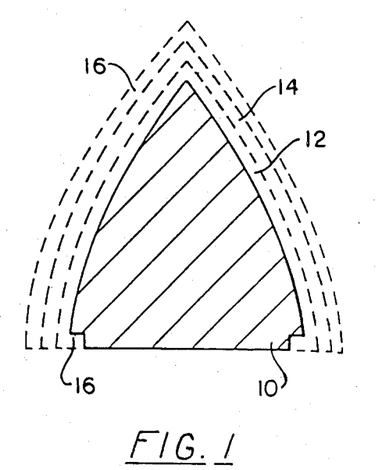
FIG. 1 shows cross-sectional views of a mandrel for use in making a unitary structure, specifically a radome, in accordance with the present invention.
Figure 2:
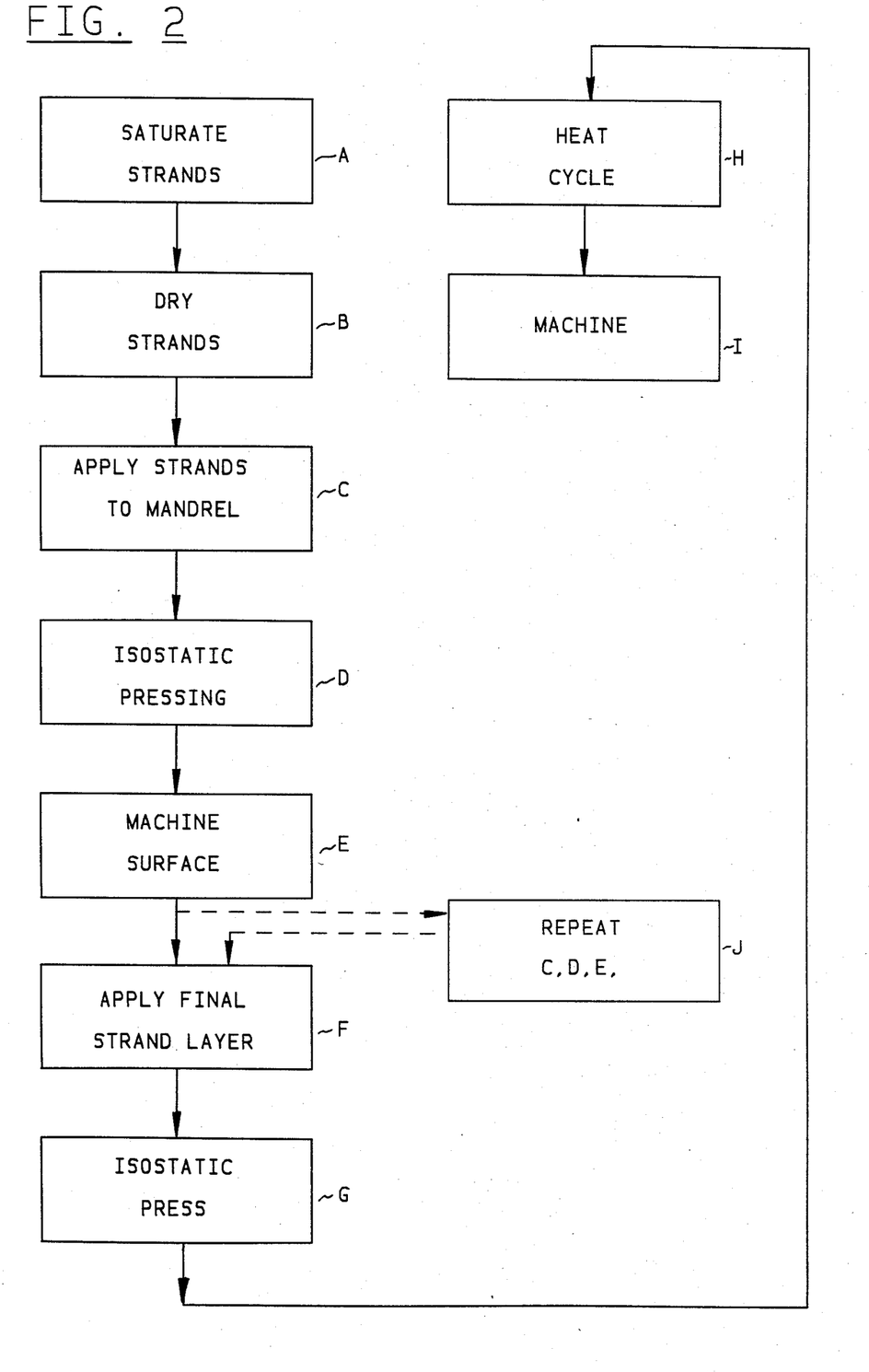
FIG. 2 is a flow diagram of the method of making a unitary structure in accordance with the present invention.

In accordance with the present invention, strands of glass or other inorganic fiber materials are saturated with PTFE or a similar fluorocarbon polymer which is in the form of an aqueous dispersion, as indicated in Step A of FIG. 2. The saturated strands are then dried free of water to leave strands containing fluorocarbon polymer particles interspersed among and coated onto the filaments. The drying step is indicated at Step B in FIG. 2. Next, the dried strands are used to build up a radome preform structure in Step C of FIG. 2. To that end, the strands are wound in multiple layers on the mandrel 10 of FIG. 1. It is expected that two or more layers of the strands will be wound upon the mandrel in alternate circumferential and longitudinal layers. Thus, a first layer 12 of the dried strands is wound circumferentially on mandrel 10 and a second layer 14 is wound in a longitudinal direction. This pair of strand layers on the mandrel is then subjected to isostatic pressing in step D to subject the strands to high pressure normal to the mandrel surface. This isostatic pressing is accomplished at in the range of from 5,000 to 100,000 psi, preferably about 30,000 psi, and at a temperature in the range of from about 20° C. to as high as about 200° C., preferably about 20°–40° C., with the maximum pressure being maintained for a time period of from about 1 to about 15 minutes, preferably about 5 minutes. The higher temperature would be preferred for the resulting improvement in compacting and reduction in the pressure required but is not convenient due to limitations in heating of the fluid in the pressure vessel and the time and cost required for heating and cooling under pressure. Hence the current preferred practical temperature is in the 20° to 40° C. range. The isostatic pressing is accomplished in the manner set forth in detail in U.S. application Ser. No. 263,191 by placing the mandrel with the stranded layers 12 and 14 within an appropriate cover bag, evacuating the bag, and then immersing the sealed bag containing the mandrel and stranded layers in an isostatic press which consists of a high pressure vessel filled with water or other suitable liquid, after which the pressure is slowly increased to the desired value, held there for the desired dwell time, and then slowly reduced back to normal. The isostatic pressing in the present invention is accomplished at a temperature range well below the melting point of the fluorocarbon polymer. The result of this pressing operation will be the formation of a rigid composite wherein cohesion between primary polymer particles is believed to be due to short range Van der Waals forces.

The mandrel with the now densified layers of strands is then removed from the bag, and the outer layer of densified longitudinal strands is then machined, in Step E, to the desired radome contour. This machining is necessary, since the wrapping of successive layers of longitudinal strands results in a thickening of the radome shape at the tip (which must be then machined in order to produce the desired and final shape).

Next, in Step F, a final outer layer of circumferentially wound strands 16 is wrapped over the machined layer of longitudinal strands, F. Then the assembly is again isostatically pressed in Step G by repeating the process of Step D to coalesce the polymer particles of layer 16 tp machined layer 14.

Next, in Step H, the assembly is heated to a temperature above the crystalline melt point of the fluorocarbon polymer (typically about 350° C. for PTFE melted for the first time); and the assembly is maintained at the temperature (typically in the range of 370° C. to 380° C.) above the crystalline melt point for a period of from about 1 hour to about 12 hours, preferably for about 4 hours; and the assembly is then cooled to room temperature over a period of from about 3 hours to about 24 hours, preferably about 6 hours. It should be noted that the range of times and preferred time for the thermal dwell above melt point and for the cooling process is not meant to be limiting. The selection of times and rates is very dependent on the size and wall thickness of the particular radome design being produced. Long enough time and slow enough rates are selected to assure uniform temperature of the assembly during the process. This heat cycling causes the primary fluorocarbon polymer particles to permanently bond by molecular diffusion across particle boundaries and improves adhesion of the particles to the reinforcing fibers.

Figure 3:
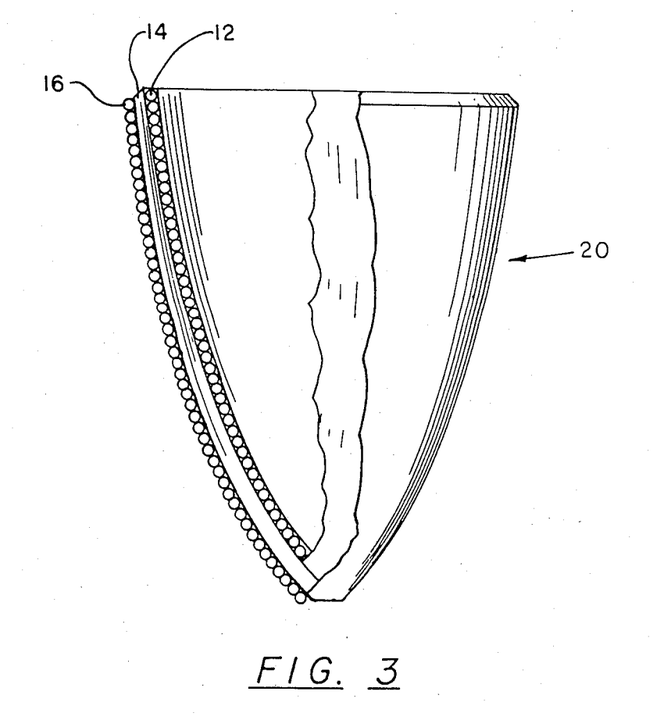
FIG. 3 is a partial sectional view of one embodiment of the present invention.

The assembly is then machined, in Step I, to the final desired radome shape; and the machined item is then removed from the mandrel to obtain a final radome structure. A final machined radome made by this method is indicated generally at 20 in FIG. 3, with the various stranded layers 12, 14 and 16 being indicated. Of course, it will be understood that the stranded layers 12, 14 and 16 are shown only illustratively to indicate that the final product is made up of these various several layers with the innermost and outermost stranded layers being circumferentially wound.

In the formation of a radome in accordance with the present invention, it may be desired to form a radome having more than three alternating circumferential and longitudinal layers. In that event, Steps C, D and E would be repeated the desired number of times to build up a radome preform having multiple alternating circumferential and longitudinal layers. This repeat processing is indicated at Step J in FIG. 2.

As a possible modification for the process and structure of the present invention, it may be desirable and beneficial to include a layer of fluorocarbon polymer material between the stranded layers to improve cohesion of the layers. The layer of fluorocarbon/polyer material may be in the form of a paste extruded and calendared sheet of dispersion type PTFE.

Also, pattern winding of strands rather than circumferential and longitudinal layers of strands could be employed.

As a further modification, woven fabrics of continuous glass filament strands could be employed for the layers instead of using wound strands. Woven fabrics are available in many styles in regard to the manner in which strands running in one direction are interwoven in the fabric with strands running in the opposite direction. For example, in a square weave, every strand alternates position over and under successively encountered strands running crosswise to its overall direction. A satin weave has strands running over a given number of crosswise strands, then under the given number, then over again, etc. A skip weave may have strands running over a given number, then under a single strand, then over the given number of strands, etc.

When such fabric structure are in a polymer matrix, i.e, with the fluorocarbon polymers of the present invention, at the same fiber volume fraction and subjected to tensile stress, it is expected that a square weave would convert that force to a greater resulting stress on individual filaments then would be the case for a satin or skip weave. As a corollary, the satin or skip weave would show a higher modulus and strength than a square weave when the overall stress is in the plane of the fabric along the overall direction of one of the two sets of strands.

In addition to a variety of weave styles, there may also be variations in the number and/or weight of strands per inch in either major direction. Thus, one could have a balanced fabric construction with equal weight and count of strands per inch in either the X or Y direction. At the other extreme, one could have a fabric consisting almost entirely of strands in the X direction with a low number and weight of Y direction strands at a level that is the minimum sufficient to keep the integrity of the fabric during handling.

In accordance with the present invention, continuous filament reinforcement of fluorocarbon polymer materials for radomes and other structures includes the use of fabrics selected from the variety described above, or other, and saturated with fluorocarbon polymer to be used in a variety of orientations either as the sole structural reinforcement or in combination with single stranded layers. The fabric may be cut to various shapes for lay up or initially woven or braided as a narrow strip for this purpose. Selection of a particular lay up scheme would depend on the requirements and economics of an individual application. Of course, the fabric saturated fluorocarbon polymers would be subjected to the same processing steps of A through I of this invention to form a final machined radome.

One particularly attractive arrangement would appear to be to wind a single saturated strand circumferentially on a mandrel to form a layer, as in Steps A, B and C of FIG. 2. Next, a longitudinally oriented layer would be placed over the circumferential layer, with the longitudinal layer consisting of a series of precut pieces of saturated fabric having a high strand weight ratio (i.e., a majority of fibers) in the longitudinal direction. These precut pieces, which will have been saturated with the fluorocarbon polymer and dried, would be so sized that each one would drape to cover a certain angular section about the mandrel axis and would have its edges abutting to neighboring longitudinal pieces. Successive layers of such pieces would be arranged so that edge abuttments of each layer occur at different angular positions about the mandrel axis. The lay up would then be isostatically pressed, as in Step D and densified, wherein the resulting wall thickness would be uniform. Thus, the machining of Step E could be eliminated. The radome would then be completed by wrapping a circumferential layer of saturated and dry strand material over the fabric surface (Step F) and then going through Steps G and H, and I if necessary.

In another embodiment, the orientation of the principal axes of layers of fabric may be varied from layer to layer in forming a multilayer fabric structure.

In another embodiment, the polymer saturated strand may be pattern wound on the mandrel. The pattern is designed to provide the desired concentration of material per unit of area over the surface of the mandrel. At the same time each area would have strands running in several directions to provide the balance of mechanical strengths needed.

Figure 4:
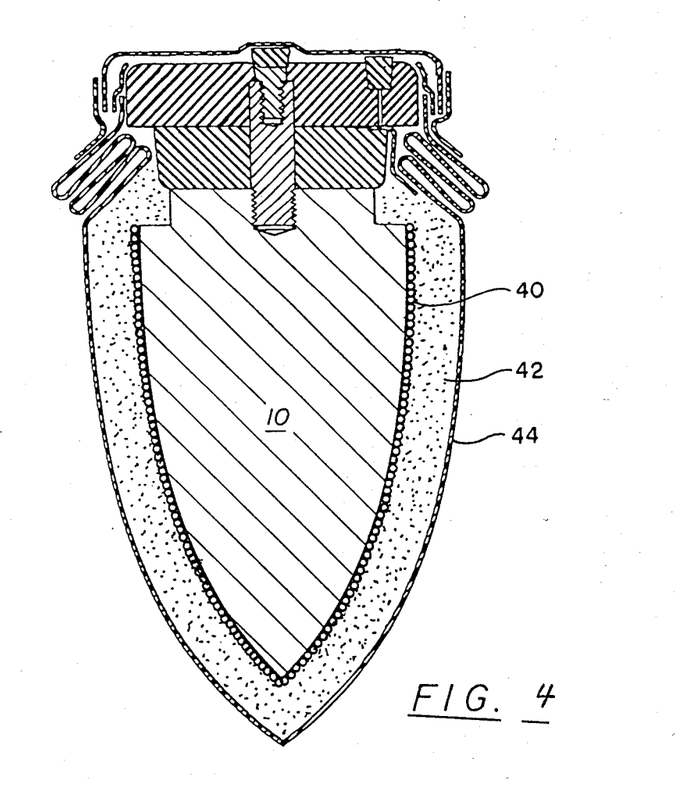
FIG. 4 is a cross-sectional view of a mandrel having an isostatically pressed layer of PTFE coated strands thereon and a PTFE composite layer in position within an elastic bag for further compacting by isostatic pressing.
Figure 5:
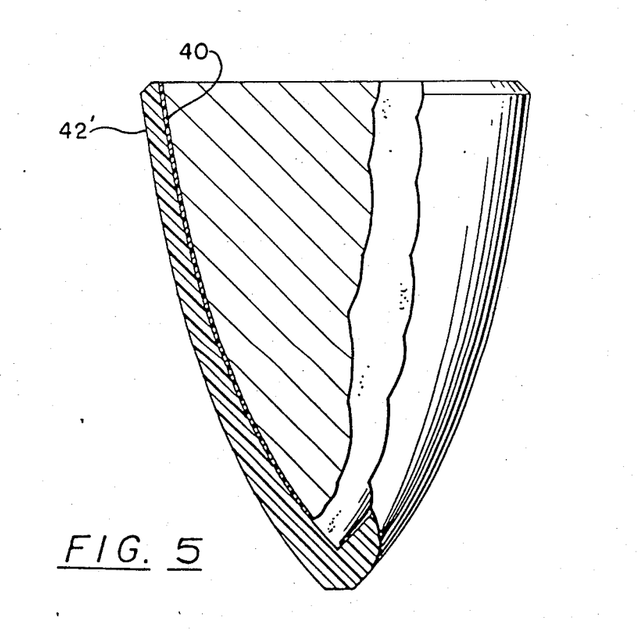
FIG. 5 is a partial sectional view of a radome formed according to FIGS. 4 and 4A.

Another embodiment of the present invention, as illustrated in FIG. 4, involves the use of a fiber reinforced PTFE composite layer as an outer layer over the stranded layers to improve longitudinal strength of of overall structure. This outer layer of a composite of fiber reinforced PTFE is the material disclosed in copending application Ser. No. 263,191, and it is applied in the same manner and by the same process as disclosed in that application. Thus, referring to FIG. 4, the mandrel 10 has one or more stranded layers 40 thereon which are formed by Steps A-F of FIG. 2, with Steps C, D and E being repeated as required. This resulting wound structure, with its mandrel, then constitutes a preform which will be further treated and handled as in U.S. application Ser. No. 263,191. That is, a powdered composite 42 of fiber and PTFE (or other fluorocarbon polymer) is isostatically pressed over the structural preform layer, heat cycled and machined to final shape as disclosed and described with regard to FIGS. 4A, 4B and 5 of U.S. application Ser. No. 263,191. FIG. 4 shows the mandrel 10 in wound preform structure and the composite material 42 within an appropriate bag 44 prior to the isostatic pressing step 20 of U.S. application Ser. No. 263,191. FIG. 4 of this application otherwise corresponds to FIG. 5 of U.S. application Ser. No. 263,191 with the bag structure sealed and evacuated for the isostatic pressing step. FIG. 5 shows the final product, wherein the radome consists of a machined outer layer 42' (which is the sintered (i.e., heat cycled) composite layer 42 of PTFE and fiber, and a inner layer 40 which consists of one or a plurality of wound stranded layers as described above).

Figure 4A:
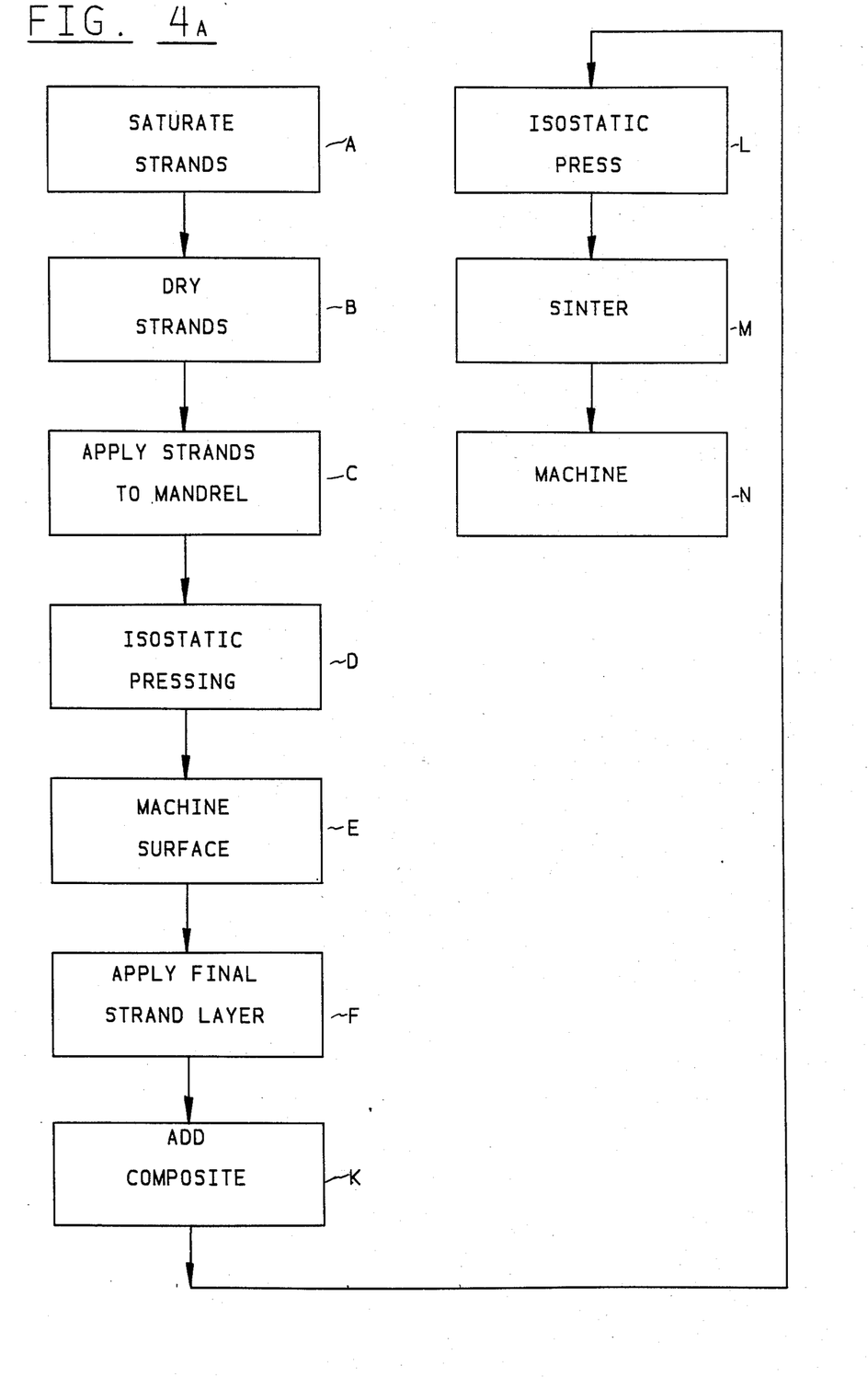
FIG. 4A is a flow diagram relating to forming the structure of FIGS. 4 and 5.

The method of forming the structure of FIGS. 4 and 5 is also indicated in FIG. 4A, wherein after completing Steps A-F of FIG. 2, the composite PTFE/fiber material is packed around the preform in Step K; the assembly is then isostatically pressed in Step L; the assembly is then sintered (i.e., heat cycled) in Step M; and the assembly is then machined to final size in Step N.

Figure 6:
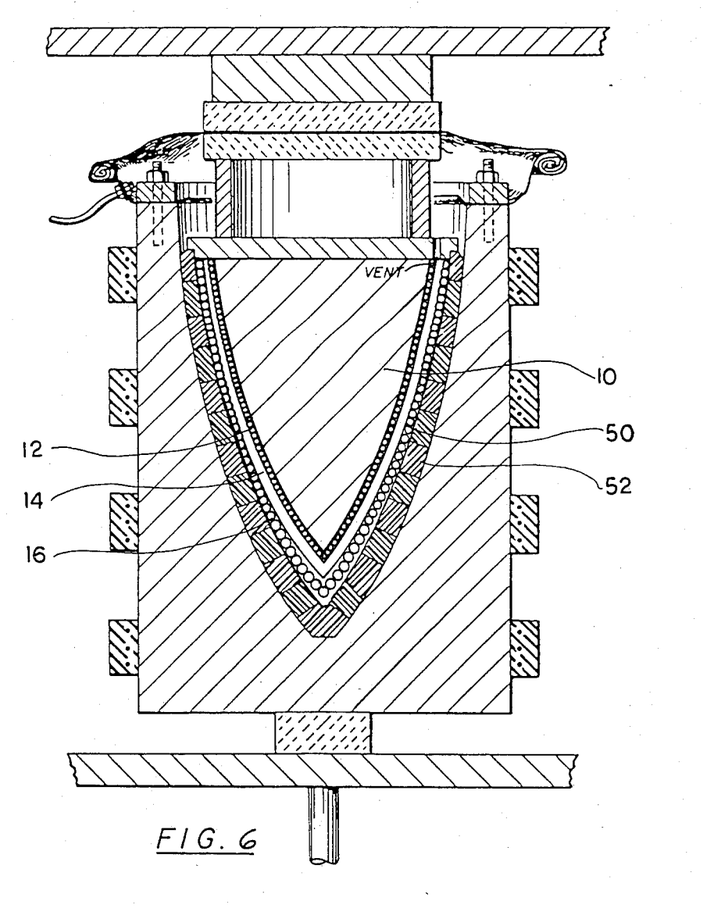
FIG. 6 is a cross-sectional view of a mold and radome structure in accordance with another embodiment of the present invention.
Figure 6A:
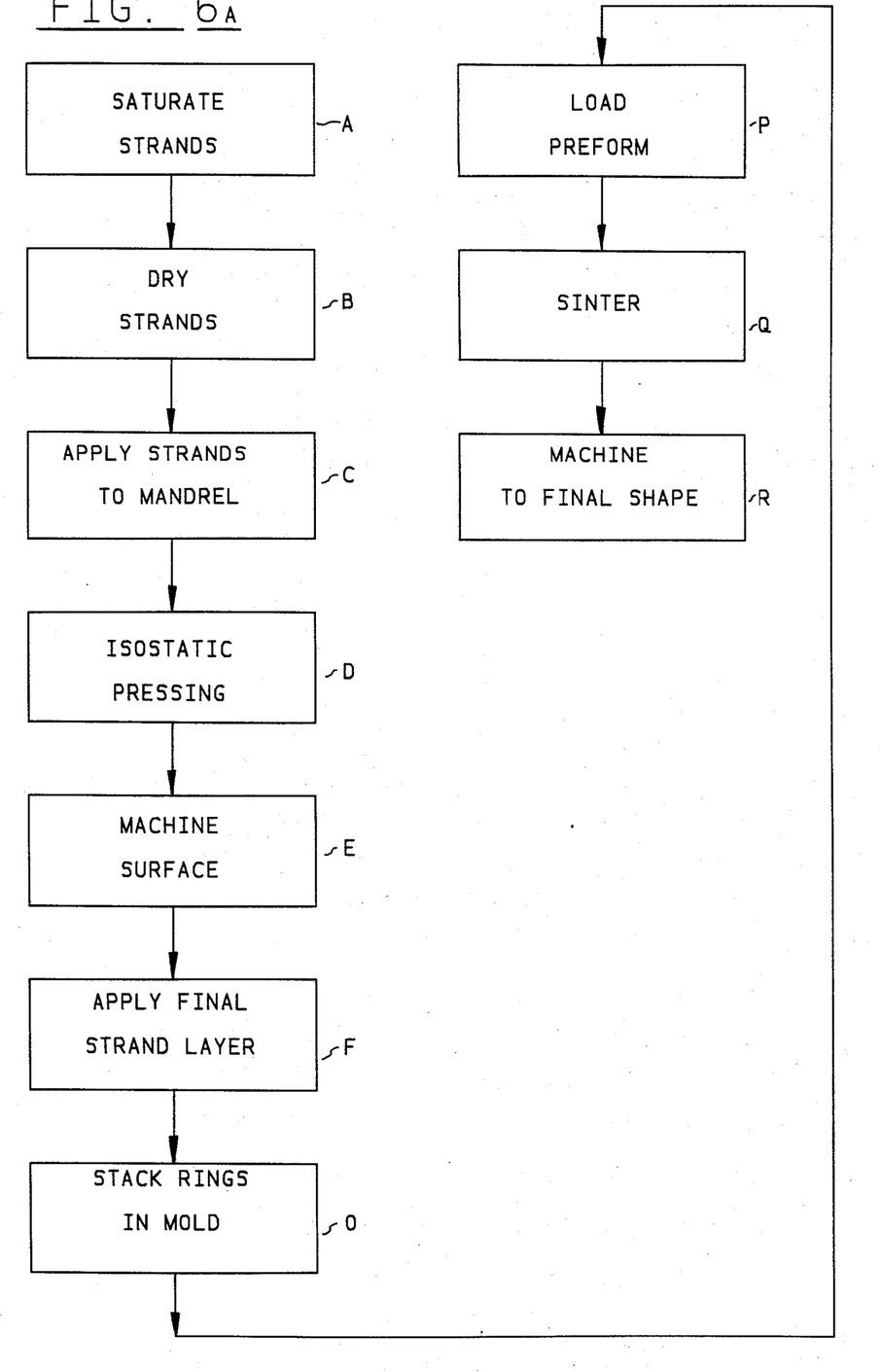
FIG. 6A is a flow diagram relating to forming the structure of FIGS. 6 and 7.
Figure 7:
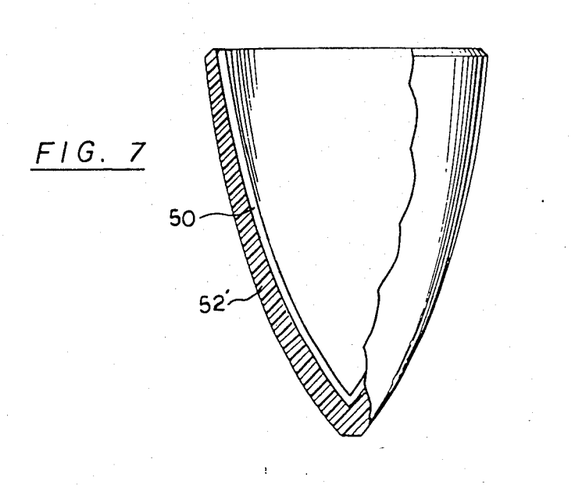
FIG. 7 is a partial sectional view of a radome formed according to FIGS. 6 and 6A.

Still another embodiment of the present invention is indicated in FIGS. 6, 6A and 7. In this embodiment, a preform is formed of a mandrel 10 and layup of a plurality of layers of stranded glass/PTFE material 50 formed through the process of Steps A-F. Then, that preform is used as a mandrel for shaped blocks of fiber reinforced PTFE material 52 which are formed and machined in accordance with the teachings of U.S. Pat. No. 4,364,884. Starting after Step F of FIG. 2, the rings 52 are loaded into an appropriate mold in accordance with the teachings of U.S. Pat. No. 4,364,884 in Step O in FIG. 6A. Next, preform (which consists of the stranded structure on a mandrel made through Step F of FIG. 2) is loaded into the mold structure at the inner surface of the rings 52 in Step P. Next, the assembly is sintered in Step Q, and then machined to final shape in Step R. The mandrel is then removed, and the resulting structure is shown in FIG. 7 having an outer ablative surface 52' over the plurality of wound layers 50. In both the embodiments of FIGS. 5 and 7, the final structures have outer layers which are integrally bonded to wound stranded inner layers which serve as structural support for the outer layers. In the final structure of FIG. 7, the outer layer of the radome 52' has the desirable ablative and rain erosion characteristics disclosed in U.S. Pat. No. 4,364,884.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for the production of bodies of complex shape, including the steps of:
    (a) saturating continuous strands of inorganic fiber material with fluorocarbon polymer material, the fluorocarbon polymer material being in the form of an aqueous dispersion;
    (b) drying the saturated fiber material to form fiber material having fluorocarbon polymer particles interspersed among and coated onto the fibers;
    (c) forming a structural preform of a plurality of layers of the dried fiber material on a forming surface;
    (d) isostatically pressing the plurality of layers to form a rigid and densified composite of the layers;
    (e) machining said composite to a desired shape;
    (f) applying at least one more layer of saturated fiber material to said composite;
    (g) isostatically pressing to coalesce the polymer particles of said layer to said machined preform.
    (h) heating the assembly to an elevated temperature above the crystalline melt point of the fluorocarbon polymer material and maintaining said assembly at said elevated temperature for a predetermined period of time; and
    (i) cooling said assembly.
2. The method of claim 1 wherein: said steps of (c),(d) and (e) are repeated.
3. The method of claim 1 including the step of: including a layer of fluorocarbon polymer material between layers of dried fiber material having interspersed polymer particles.
4. The method according to claims 1, 2 or 3 wherein: said fiber material is fabric material woven from said strands of inorganic fiber material.
5. The method of claim 1 wherein said steps of forming a structural preform includes:
    forming a first layer of stranded fiber material in a first direction on said forming surface; and
    forming a second layer of stranded fiber material in a second direction on said first layer of strands.
6. The method according to claim 5 wherein said step of applying at least one more layer of stranded fiber material includes:
    forming a third layer of stranded fiber material to said composite.
7. The method according to claim 5 wherein:
    said first layer of stranded fiber material is wound circumferentially about a mandrel; and
    said second layer of stranded fiber material is wound longitudinally about a mandrel.
8. The method of claim 7 wherein said step of applying at least one more layer of saturated fiber material includes:
    forming a third layer of stranded fiber material circumferentially about the mandrel.
9. The method according to claim 1 wherein:
    isostatic pressing is accomplished at a pressure range of from about 5,000 psi to about 100,000 psi and at a temperature in the range of from about 20° C. to about 200° C.
10. The method according to claim 1 wherein:
    isostatic pressing is accomplished at a pressure range of from about 30,000 psi to about 100,000 psi and at a temperature in the range of from about 20° C. to about 40° C.
11. The method according to claim 1 including:
    machining the assembly as necessary to form a body of desired shape.
12. A method for the production of bodies of complex shape, including the steps of:
    (a) saturating continuous strands of inorganic fiber material with fluorocarbon polymer material, the fluorocarbon polymer material being in the form of an aqueous dispersion;
    (b) drying the saturated fiber material to form fiber material having fluorocarbon polymer particles interspersed among and coated onto the fibers;
    (c) forming a structural preform of at least one layer of dried fiber material on a forming surface;
    (d) applying to said preform a powdered composite layer of fibers and fluorocarbon polymer;
    (e) isostatically pressing said powdered composite layer over said preform;
    (f) heating the assembly to an elevated temperature above the crystalline melt point of the fluorocarbon polymer material and maintaining said assembly at said elevated temperature for a predetermined period of time; and
    (g) cooling said assembly.
13. The method of claim 12 including the steps of:
    machining said preform as necessary to form a desired shape; and
    machining said assembly as necessary to form a body of desired shape.

14. The method of claims 12 or 13 wherein said step of forming a structural preform includes:
   forming a structural preform of a plurality of layers of dried fiber material on a forming surface; and
   isostatically pressing the plurality of layers to form a rigid and densified composite of the layers.

15. The method of claim 14 wherein:
   the step of forming a structural preform of a plurality of layers of dried fiber material and the step of isostatically pressing are repeated for successive layers of dried fiber material.

16. The method according to claim 12 or 13 wherein:
   said fiber material is fabric material woven from said strands of inorganic fiber material.

17. The method of claim 12 wherein said steps of forming a structural preform includes:
   forming a first layer of stranded fiber material in a first direction on said forming surface; and
   forming a second layer of stranded fiber material in a second direction on said first layer of strands.

18. The method according to claim 17 including:
   applying a third layer of stranded fiber material to said composite.

19. The method of claim 17 wherein:
   said first layer of stranded fiber material is wound circumferentially about a mandrel; and
   said second layer of stranded fiber material is wound longitudinally about a mandrel.

20. The method according to claim 19 including:
   applying a third layer of stranded fiber material circumferentially about the mandrel.

21. The method according to claim 12 wherein:
   isostatic pressing is accomplished at a pressure range of from about 5,000 psi to about 100,000 psi and at a temperature in the range of from about 20° C. to about 200° C.

22. The method according to claim 12 wherein:
   isostatic pressing is accomplished at a pressure range of from about 30,000 psi to about 100,000 psi and at a temperature in the range of from about 20° C. to about 40° C.

23. A method for the production of bodies of complex shape, including the steps of:
   (a) saturating continuous strands of inorganic fiber material with fluorocarbon polymer material, the fluorocarbon polymer material being in the form of an aqueous dispersion;
   (b) drying the saturated fiber material to form fiber material having fluorocarbon polymer particles interspersed among and coated onto the fibers;
   (c) forming a structural preform of at least one layer of dried fiber material on a forming surface;
   (d) forming segments of fiber reinforced fluoropolymer material of a complex shape;
   (e) stacking said segments in a mold;
   (f) placing said structural preform in said mold within said segments;
   (g) heating the assembly to an elevated temperature above the crystalline melt point of the fluorocarbon polymer material and maintaining said assembly at said elevated temperature for a predetermined period of time; and
   (h) cooling said assembly.

24. The method of claim 23 including the steps of:
   machining said preform as necessary to form a desired shape; and
   machining said assembly as necessary to form a body of desired shape.

25. The method of claims 23 or 24 wherein said step of forming a structural preform includes:
   forming a structural preform of a plurality of layers of dried fiber material on a forming surface; and
   isostatically pressing the plurality of layers to form a rigid and densified composite of the layers.

26. The method of claim 25 wherein:
   the step of forming a structural preform of a plurality of layers of dried fiber material and the step of isostatically pressing are repeated for success layers of dried fiber material.

27. The method according to claims 23 or 24 wherein:
   said fiber material is fabric material woven from said strands of inorganic fiber material.

28. The method of claim 23 wherein said steps of forming a structural preform includes:
   forming a first layer of stranded fiber material in a first direction on said forming surface; and
   forming a second layer of stranded fiber material in a second direction on said first layer of strands.

29. The method according to claim 28 including:
   applying a third layer of stranded fiber material to said composite.

30. The method according to claim 20 wherein:
   said first layer of stranded fiber material is wound circumferentially about a mandrel; and
   said second layer of stranded fiber material is wound longitudinally about a mandrel.

31. The method according to claim 30 including:
   applying a third layer of stranded fiber material circumferentially about the mandrel.

32. The method according to claim 23 wherein:
   isostatic pressing is accomplished at a pressure range of from about 5,000 psi to about 100,000 psi and at a temperature in the range of from about 20° C. to about 200° C.

33. The method according to claim 23 wherein:
   isostatic pressing is accomplished at a pressure range of from about 30,000 psi to about 100 000 psi and at a temperature in the range of from about 20° C. to about 40° C.

34. A method for the production of bodies of complex shape, including the steps of:
   (a) saturating continuous strands of inorganic fiber material with fluorocarbon polymer material, the fluorocarbon polymer material being in the form of an aqueous dispersion;
   (b) drying the saturated fiber material to form fiber material having fluorocarbon polymer particles interspersed among and coated onto the fibers;
   (c) forming a first layer of the dried fiber material in strand form on a forming surface, with the strand material generally oriented in a first direction;
   (d) placing over said strand layer a second layer of segments of the dried fiber material in woven form, said woven material having a high strand weight ratio in a second direction;
   (e) isostatically pressing said first and second layers to form a rigid and densified composite of said layers;
   (f) applying a third layer of the dried fiber material in strand form over said composite in the direction of said first layer;
   (g) isostatically pressing to coalesce the polymer particles of said third layer of said composite;
   (h) heating the assembly to an elevated temperature above the crystalline melt point of the fluorocarbon polymer material and maintaining said assembly at said elevated temperature for a predetermined period of time; and
(i) cooling said assembly.

35. The method of claim 34 wherein:
said segments of material in woven form are arranged in edge abutting relationship to entirely cover said first layer.

36. The method of claims 34 or 35 wherein:
said first layer of strand material is wound circumferentially about a mandrel; and
said second layer of woven material has a majority of fibers in a direction longitudinal with respect to the mandrel; and
said third layer of strand material is wound circumferentially about the mandrel.

37. A unitary structure of predetermined shape, said structure being formed by:
(a) saturating continuous strands of inorganic fiber material with fluorocarbon polymer material, the fluorocarbon polymer material being in the form of an aqueous dispersion;
(b) drying the saturated fiber material to form fiber material having fluorocarbon polymer particles interspersed among and coated onto the fibers;
(c) forming a structural preform of a plurality of layers of the dried fiber material on a forming surface;
(d) isostatically pressing the plurality of layers to form a rigid and densified composite of the layers;
(e) machining said composite to a desired shape;
(f) applying at least one more layer of saturated fiber material to said composite;
(g) isostatically pressing to coalesce the polymer particles of said layer to said machined preform.
(h) heating the assembly to an elevated temperature above the crystalline melt point of the fluorocarbon polymer material and maintaining said assembly at said elevated temperature for a predetermined period of time; and
(i) cooling said assembly.

38. The method of claim 1 wherein:
said steps of (c), (d) and (e) are repeated.

39. The structure of claim 37 formed by:
including a layer of fluorocarbon polymer material between layers of dried fiber material having interspersed polymer particles.

40. The structure according to claims 37, 38, or 39 wherein:
said fiber material is fabric material woven from said strands of inorganic fiber material.

41. The structure of claim 37 wherein said structure is formed by:
forming a first layer of straned fiber material in a first direction on said forming surface; and
forming a second layer of stranded fiber material in a second direction on said first layer of strands.

42. The structure according to claim 41 wherein said structure is formed by:
forming a third layer of stranded fiber material on said composite.

43. The structure according to claim 41 wherein:
said first layer of stranded fiber material is wound circumferentially about a mandrel; and
said second layer of stranded fiber material is wound longitudinally about a mandrel.

44. The structure of claim 43 wherein said structure is formed by:
forming a third layer of stranded fiber material circumferentially about the mandrel.

45. The structure according to claim 37 wherein said structure is formed by:
isostatic pressing at a pressure range of from about 5,000 psi to about 100,000 psi and at a temperature in the range of from about 20° C. to about 200° C.

46. The structure according to claim 37 wherein said structure is formed by:
isostatic pressing at a pressure range of from about 30,000 psi to about 100,000 psi and at a temperature in the range of from about 20° C. to about 40° C.

47. The structure according to claim 37 wherein said structure is formed by:
machining the assembly as necessary to form a body of desired shape.

48. The unitary structure or claim 46 wherein:
said unitary structure is a radome in the form of a body of revolution about an axis.

49. The unitary structure of claim 47 wherein:
said unitary structure is a randome in the form of a body of revolution about an axis.

50. The unitary structure of claim 37 wherein:
said unitary structure is a radome in the form of a body of revolution about an axis.

51. A unitary structure of predetermined shape, said structure being formed by:
(a) saturating continuous strands of inorganic fiber material with fluorocarbon polymer material, the fluorocarbon polymer material being in the form of an aqueous dispersion;
(b) drying the saturated fiber material to form fiber material having fluorocarbon polymer particles interspersed among and coated onto the fibers;
(c) forming a structural preform of at least one layer of dried fiber material on a forming surface;
(d) applying to said preform a powdered composite layer of fibers and fluorocarbon polymer;
(e) isostatically pressing said powdered composite layer over said preform;
(f) heating the assembly to an elevated temperature above the crystalline melt point of the fluorocarbon polymer material and maintaining said assembly at said elevated temperature for a predetermined period of time; and
(g) cooling said assembly.

52. The structure of claim 51 wherein said structure is formed by:
machining said preform as necessary to form a desired shape; and
machining said assembly as necessary to form a body of desired shape.

53. The structure of claims 51 or 52 wherein:
said structural preform is formed of a plurality of layers of dried fiber material on a forming surface, said plurality of layers being isostatically pressed to form a rigid and densified composite of the layers.

54. The structure of claim 53 wherein:
said structural preform is formed of successive pluralities of layers of dried fiber material which are isostatically pressed.

55. The structure according to claims 51, 52 or 54 wherein:
said fiber material is fabric material woven from said strands of inorganic fiber material.

56. The structure of claim 51 wherein structural preform is formed by:

forming a first layer of stranded fiber material in a first direction on said forming surface; and forming a second layer of stranded fiber material in a second direction on said first layer of strands.

57. The structure according to claim 56 including:
a third layer of stranded fiber material applied to said composite.

58. The structure according to claim 56 wherein:
said first layer of stranded fiber material is wound circumferentially about a mandrel; and
said second layer of stranded fiber material is wound longitudinally about a mandrel.

59. The structure according to claim 58 including:
a third layer of stranded fiber material applied circumferentially about the mandrel.

60. The structure according to claim 51 wherein said structure is formed by:
isostatic pressing at a pressure range of from about 5,000 psi to about 100,000 psi and at a temperature in the range of from about 20° C. to about 200° C.

61. The structure according to claim 51 wherein said structure is formed by:
isostatic pressing at a pressure range of from about 30,000 psi to about 100,000 psi and at a temperature in the range of from about 20° C. to about 40° C.

62. The unitary structure of claim 60 wherein:
said unitary structure is a radome in the form of a body of revolution about an axis.

63. The unitary structure of claim 61 wherein:
said unitary structure is a radome in the form of a body of revolution about an axis.

64. The unitary structure of claim 51 wherein:
said unitary structure is a radome in the form of a body of revolution about an axis.

65. A unitary structure of predetermined shape, said structure being formed by:
(a) saturating continuous strands of inorganic fiber material with fluorocarbon polymer material, the fluorocarbon polymer material being in the form of an aqueous dispersion;
(b) drying the saturated fiber material to form fiber material having fluorocarbon polymer particles interspersed among and coated onto the fibers;
(c) forming a structural preform of at least one layer of dried fiber material on a forming surface;
(d) forming segments of fiber reinforced fluoropolymer material of a complex shape;
(e) stacking said segments in a mold;
(f) placing said structural preform in sa d mold within said segments;
(g) heating the assembly to an elevated temperature above the crystalline melt point of the fluorocarbon polymer material and maintaining said assembly at said elevated temperature for a predetermined period of time; and
(h) cooling said assembly.

66. The structure of claim 65 wherein said structure is formed by:
machining said preform as necessary to form a desired shape; and
machining said assembly as necessary to form a body of desired shape.

67. The structure of claims 65 or 66 wherein:
said structural preform is formed of a plurality of layers dried fiber material on a forming surface, said plurality of layers being isostatically pressed to form a rigid and densified composite of the layers.

68. The structure of claim 67 wherein:
said structural preform is formed of successive pluralities of layers of dried fiber material which are isostatically pressed.

69. The structure according to claim 65 or 66 wherein:
said fiber material is fabric material woven from said strands of inorganic fiber material.

70. The structure of claim 65 wherein said structural preform is formed by:
forming a first layer of stranded fiber material in a first direction on said forming surface; and
forming a second layer of stranded fiber material in a second direction on said first layer of strands.

71. The structure according to claim 70 including:
a third layer of stranded fiber material applied to said composite.

72. The structure according to claim 70 wherein:
said first layer of stranded fiber material is wound circumferentially about a mandrel; and
said second layer of stranded fiber material is wound longitudinally about a mandrel.

73. The structure according to claim 72 including:
a third layer of stranded fiber material applied circumferentially about the mandrel.

74. The structure according to claim 65 wherein said structure is formed by:
isostatic pressing at a pressure range of from about 5,000 psi to about 100,000 psi and at a temperature in the range of from about 20° C. to about 200° C.

75. The structure according to claim 65 wherein said structure is formed by:
isostatic pressing at a pressure range of from about 30,000 psi to about 100,000 psi and at a temperature in the range of from about 20° C. to about 40° C.

76. A unitary structure of predetermined shape, said structure being formed by:
(a) saturating continuous strands of inorganic fiber material with fluorocarbon polymer material, the fluorocarbon polymer material being in the form of an aqueous dispersion;
(b) drying the saturated fiber material to form fiber material having fluorocarbon polymer particles interspersed among and coated onto the fibers;
(c) forming a first layer of the dried fiber material in strand form on a forming surface, with the strand material generally oriented in a first direction;
(d) placing over said strand layer a second layer of segments of the dried fiber material in woven from, said woven material having a high strand weight ratio in a second direction;
(e) isostatically pressing said first and second layers to form a rigid and densified composite of said layers;
(f) applying a third layer of the dried fiber material in strand form over said composite in the direction of said first layer;
(g) isostatically pressing to coalesce the polymer particles of said third layer of said composite;
(h) heating the assembly to an elevated temperature above the crystalline melt point of the fluorocarbon polymer material and maintaining said assembly at said elevated temperature for a predetermined period of time; and
(i) cooling said assembly.

77. The structure of claim 76 wherein:
said segments of material in woven form are arranged in edge abutting relationship to entirely cover said first layer.

78. The structure of claims 76 or 77 wherein:

said first layer of strand material is wound circumferentially about a mandrel; and said second layer of woven material has a majority of fibers in a direction longitudinal with respect to the mandrel; and said third layer of strand material is wound circumferentially about the mandrel.

* * * * *